United States Patent [19]

Wang et al.

[11] Patent Number: 5,032,253
[45] Date of Patent: Jul. 16, 1991

[54] PREPARATION OF TITANIUM-ZIRCONIUM-VANADIUM MIXED OXIDES AND ITS APPLICATION ON FUEL OIL HYDRODESULFURIZATION AND HYDRODENITROGENATION

[75] Inventors: Ikai Wang, Hsinchu; Jung-Chung Wu, Chia-Yi, both of Taiwan

[73] Assignee: Chinese Petroleum Corp., Tai Pei, Taiwan

[21] Appl. No.: 483,117

[22] Filed: Feb. 22, 1990

[51] Int. Cl.$^5$ .............................................. C10G 1/00
[52] U.S. Cl. .......................... 208/254 H; 208/216 R; 502/304
[58] Field of Search ................... 502/304; 208/254 H, 208/216 R

[56] References Cited

U.S. PATENT DOCUMENTS 3,799,888  3/1974  Suvorov ............................. 502/304
4,128,505  12/1978  Mikovsky et al. .................. 502/304

Primary Examiner—Helane E. Myers
Attorney, Agent, or Firm—Morrison Law Firm

[57] ABSTRACT

The present invention is related to a process of fuel oil hydrodesulfurization and hydrodenitrogenation, wherein a cobalt-Molybdenum catalyst is prepared on a carrier of titanium-zirconium-vanadium mixed oxides, and the reaction is carried out in a fixed-bed reactor under reaction conditions. The present invention discloses the operating conditions of desulfurization and denitrogenation reactions, and the optimal compositions of said catalysts as well as its preparation method.

2 Claims, 1 Drawing Sheet

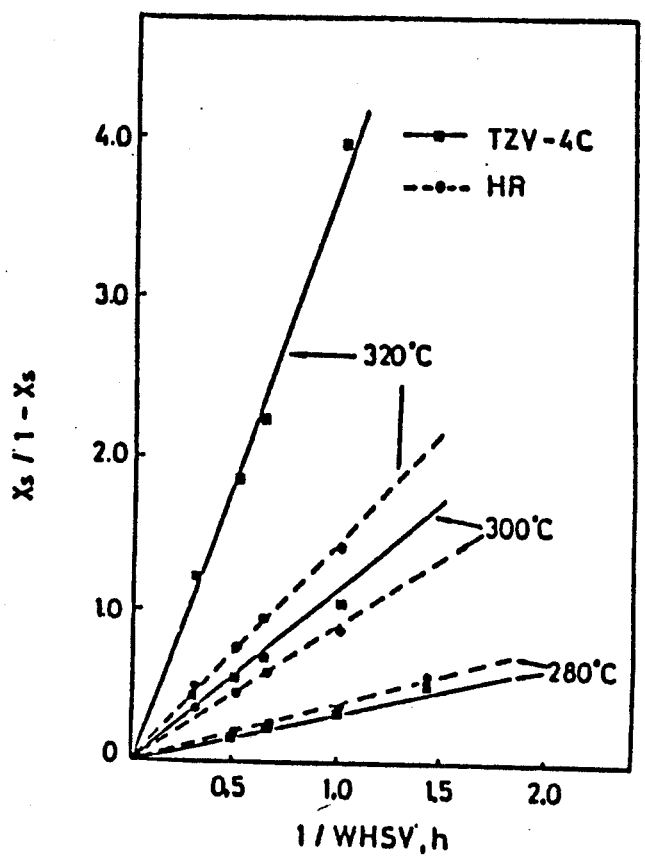
Fig..1
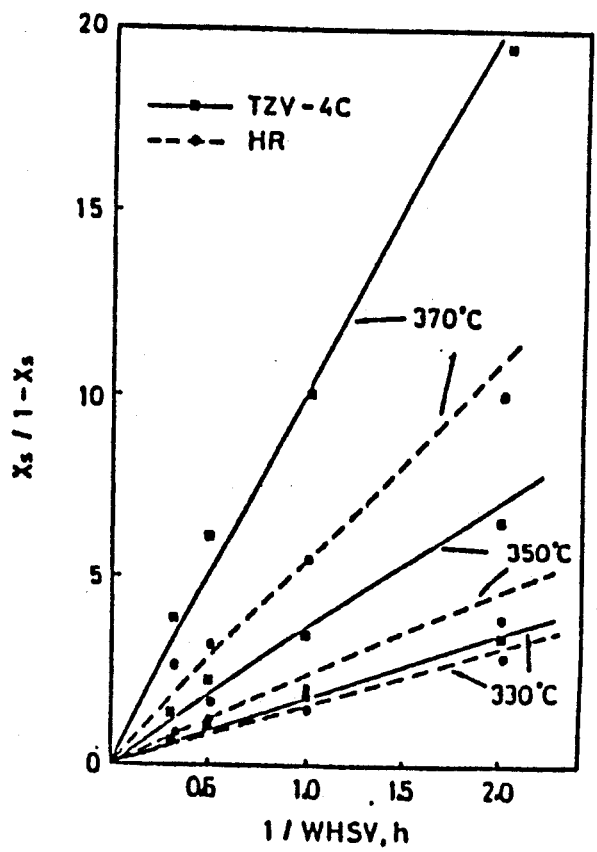
Fig. 2

1

PREPARATION OF TITANIUM-ZIRCONIUM-VANADIUM MIXED OXIDES AND ITS APPLICATION ON FUEL OIL HYDRODESULFURIZATION AND HYDRODENITROGENATION

DETAILED DESCRIPTION OF THE INVENTION

Hydrodesulfurization (HDS) and Hydrodenitrogenation (HDN) are important processes in the petroleum refining industry. Desulfurization and denitrogenation of naphtha are carried out to prevent the platinum catalyst, which used in reformer, being poisoned and losing its activation capacity. The purpose of desulfurization of mid-distillate (such as heating oil) is to avoid the corrosion of equipment and improve a product quality. As to the lub-oil, the desulfurization can remove the odor and stabilize the color. The purpose of residue oil desulfurization is to reduce air pollution. The sulfur and nitrogen compounds in the crude oil are distributed in different distillates at various ratios after topping process. The heavier the distillates, the more the sulfur and nitrogen compounds, and the larger the molecules will be. Therefore, different catalysts are required for these complicated reaction conditions.

It has been longer than 50 to 60 years, that transition metal sulfides have been employed as HDS and HDN catalysts. Currently, it is still the most effective one in this respect. The most common catalyst is the sulfide form of Mo and W from Group VIA, and promoted by Co and Ni from Group VIII. These active ingredients are normally supported on a carrier. The most common used carrier is $\gamma$-alumina. The carrier provides not only high surface area to increase the number of active centers of the catalyst, but also influences the reactivities and selectivities of the catalyst through its structure and acidity. CoMo or NiMo has its own optimal composition, that is the highest activity can only be obtained under proper ratio of Co/Mo or Ni/Mo. The $\gamma$-alumina supported catalyst usually contains 8 to 15 wt % of $MoO_3$, and the atomic ratio of Co/Mo or Ni/Mo is ranged from 0.3 to 0.6. Different carriers have different optimal compositions. The carrier has little influence on the optimal ratio of Co/Mo or Ni/Mo; however, as the acidity of the carrier increases, the ratio of metal components of the catalyst will have less effect on the HDS and HDN. That is, as the acidity of carrier increases, the role of metal oxide in the reaction becomes less significant. Additionally, the $\gamma$-alumina reacts with active components during the preparation of the catalyst. For example, the sodium ion in the $\gamma$-alumina will occupy the vacant position in $Al^{3+}$ and block the cobalt ion from entering the position which will result in difficulty of reduction. The $MoO_3$ reacts with $\gamma$-alumina and forms a monolayer structure. If more $MoO_3$ is present, some $Al_2(MoO_4)_3$ will be formed. It indicates the reactions between $MoO_3$ and carrier not only form monolayer structure, but also cause the migration of $Al^{3+}$ into the monolayer structure and the migration of $Mo^{6+}$ into the interior of the carrier. In the case of a small amount of cobalt and nickel, the species stay as a monolayer. As the loadings increase, cobalt and nickel ion might migrate into the interior of the carrier. Compared with cobalt ion, the nickel ion move faster and occupies a octahedral, and the cobalt ion takes a tetrahedral position. In the HDS catalyst, cobalt or nickel does have structural reaction with molybdenum. This reaction is related to the structure of carriers and the process of calcination. There are several speculations of the mechanism of active structure during desulfurization; however, the most acceptable one is a Co—Mo—S model. How to obtain the most Co—Mo—S structure is the key to improve this type of catalysts. It relates to the preparation conditions, calcination temperatures, the contents of active components, Co/Mo ratio and the properties of carriers.

In hydrodenitrogenation, such as quinoline denitrogenation, the hydrogenolysis of C—N bond is believed to be the rate determining step. Therefore, a bifunctional catalyst is necessary for this reaction to proceed. The acid function is useful to react with basic nitrogen atom, and the adjacent transition metal reacts with $\gamma$-carbon in the nitrogen ring. Thus, the strength of the C—N bond is reduced and the reactivity increases. Consequently, the reaction takes place at lower temperature which will ease the coking during the reaction. In indole denitrogenation, the saturation of nitrogen-containing five membered ring is the rate controlling step. Therefore, it is necessary to enhance the capability of hydrogenation. The acidity of the carrier helps the hydrogenation to proceed. In hydrodesulfurization, such as hydrodesulfurization of benzothiophene or dibenzothiophene, the reaction mechanism accepted by most people is the multi-point reaction model wherein the benzene ring is first adsorbed on the carrier to form a $\pi$-complex, and then undergoes hydrogenation and desulfurization. Therefore, the reactivity is also related to the acidity of carriers. However, if the acidity of carriers is too high, for instance zeolite is used as carriers, the cracking reaction will occur. The cracking reaction will reduce the activity of catalysts due to coking. To find a proper carrier is an important subject to improve the performance of catalysts. To meet the above mentioned requirements, the present invention selects Ti—Zr—V mixed oxides as the carrier. The Ti—Zr—V mixed oxides have high surface area, suitable acidity and high reactivity in hydrogenation, which makes such oxides potential carriers for HDS and HDN catalysts.

In the present invention, instead of conventional $\gamma$-alumina, a titanium-zirconium-vanadium mixed oxide is chosen as a carrier to prepare the cobalt-molybdenum catalyst for the HDS of heavy diesel and vacuum gas oil. The stepwise procedures of preparing the inventive Co—Mo/Ti—Zr—V catalyst are described in the following step 1. Preparing the anhydrous alcohol solutions of titanium, zirconium and vanadium, wherein the titanium, zirconium and vanadium compounds can be chloride compounds or other organic compounds;

step 2. Mixing the alcohol solutions in different ratios, after well mixing, adding aqueous ammonia dropwisely into the mixture while stirring, in which a white coprecipitate will be obtained;

step 3. Aging the mixture containing the white coprecipitate overnight, and then centrifuging the mixture, washing the resulting cake with de-ionized water and drying the washed cake at 110° C.;

step 4. Calcining the dried cake from the above step 3 at 550° C. for 2 hours to obtain a Ti—Zr—V carrier;

step 5. Preparing an ammonium heptamolybdate solution and a cobalt nitrate solution;

step 6. Adding the ammonium heptamolybdate solution gradually into the Ti—Zr—V carrier by incipient wetness method, in which if a required amount of molybdenum can not be added at one time, add the total amount sequentially;

step 7. Putting the sample from step 6 in a light-shaded place until it is dry, and then drying the sample at 100° C. for 6 hours, heating the sample from room temperature to 400° C. at a rate of 1° C./min and maintaining the temperature at 400° C. for 6 hours, and then raising the temperature up to 500° C. at a rate of 10° C./min and maintaining the temperature at 500° C. for 2 hours; and step 8. Using incipient wetness method as described in step 6 and procedures described in step 7 to load the cobalt onto the carrier to obtain a CoMo/Ti—Zr—V catalyst.

In addition, for the purpose of comparision, the γ-alumina is used as carrier. Co and Mo are loaded onto γ-alumina according to steps 5-8 to obtain CoMo/γ-Al$_2$O$_3$ catalyst.

The catalyst prepared by the above mentioned steps is first pre-sulfided with 6% CS$_2$ toluene solution; the conditions are: LHSV, 1.25; hydrogen/toluene mole ratio of 6; pressure, 430 psig; temperature, increased from 50° to 250° C. at the rate of 50° C./hr and maintained for 16 hrs, and brought up to 350° C. at 50° C./hr, and staying at that temperature for 24 hrs.

The presulfided catalysts were then studied in a continuous fixed bed reactor to determine the catalytic activities under the following reaction conditions: temperature, 230°-250° C.; pressure, 500 psig; WHSV, 0.5-8.0 W/W/hr. The feeds used in these tests are synthetic feed, heavy diesel and vacuum gas oil. The composition of the synthetic feed is listed in Table 1.

TABLE 1

| Compositions of Synthetic Feed | | |
|---|---|---|
| | Composition (wt %) | |
| Compounds | A | B |
| Dibenzothiophene | 1.1 | 1.0 |
| Aniline | 1.0 | — |
| Cumene | 1.0 | 1.0 |
| Mesitylene | 50.0 | 50.0 |
| Toluene | 46.5 | 47.6 |
| CS$_2$ | 0.4 | 0.4 |
| Pyridine | 0.1 | — |
| Sulfur (wt %) | 0.51 | 0.51 |
| Nitrogen (wt %) | 0.17 | — |

Physical properties of heavy diesel and vacuum gas oil are: Sp. Gr.: 0.846, S: 1.14 wt %; b. p. (5/95): 160°-370° C., and Sp. Gr.: 0.982, S: 2.15 wt %; N: 525 ppm; b. p. (5/95): 320°-510° C. respectively.

The results of experiments indicate that the kinetic model of desulfurization and denitrogenation of dibenzothiophene and aniline is a pseudo-first-order reaction, i.e. $-\gamma_i = kP_{H2}{}^n = k'P_i$, when the concentrations of sulfur and nitrogen compounds are low. The i in the equation represents the type of compounds, such as dibenzothiophene and aniline. The above equation is simplified because the hydrogen is much excess relative to dibenzothiophene and aniline.

After integrating the above equation, it becomes $$-\ln(1-x_i) = k_i/WHSV \tag{1}$$

where $x_i$ is conversion; $k_i$ is apparent reaction rate constant; WHSV is mass space velocity.

For the desulfurization of heavy diesel and vacuum gas oil, a pseudo-second-order reaction is observed. The working equation is $$x_2/1-x_s = k_{2nd}/WHSV \tag{2}$$

where $x_s$ is sulfur conversion; $k_{2nd}$ is apparent 2nd order reaction rate constant. Using these data, catalysts reactivities are compared. For example: at the same WHSV value, the larger the $x_s/1-x_s$ ratio is, the higher sulfur conversion is and the higher catalyst reactivity is. In addition, the k value is also compared for different catalysts at the same temperature.

EXAMPLE 1

The effect of vanadium content in Ti—Zr—V carrier on reactivities of HDS and HDN.

Catalysts with fixed amount of MoO$_3$ (4%) and CoO (2%) are prepared. The composition of Ti—Zr—V carrier is represented as TiO$_2$/ZrO$_2$/V$_2$O$_5$=1/1/x, where x values are 0.025, 0.05, 0.075, 0.10, 0.15 and 0.20. The physical properties of the catalysts are list in Table 2.

TABLE 2

| Physical Properties of various compositions of CoMo/Ti-Zr-V Catalysts | | | | | | | |
|---|---|---|---|---|---|---|---|
| | x | | | | | | |
| | 0 | 0.025 | 0.05 | 0.075 | 0.10 | 0.15 | 0.20 |
| Surface area, m$^2$/g | 208 | 175 | 118 | 104 | 88 | 72 | 53 |
| Pore volume, c.c./g | 0.34 | 0.34 | 0.31 | 0.31 | 0.32 | 0.32 | 0.33 |
| Mean pore diameter, Å | 65 | 78 | 105 | 120 | 150 | 180 | 250 |

Note:
1. x represents mole ratio of V$_2$O$_5$ in Ti-Zr-V carrier
2. Physical properties were measured after 550° C. precalcined.

The above prepared catalysts were utilized in the HDS and HDN of synthetic feed A and B, and the reactivities were determined at the reaction conditions of 350° C., 500 psig and WHSV=2. The experimental data were used to calculate the reaction rate constants for different catalysts using equation (1), and the results are listed in Table 3. The data shown in Table 3 indicate that the reactivity of HDS increases as the V$_2$O$_5$ content increases, and reaches a maximum point at 0.05 mole ratio. The HDS reactivity decreases sharply as the V$_2$O$_5$ content increases. The HDN reactivity also shows a maximum point of 0.05 mole ratio of V$_2$O$_5$. Differing from HDS, the HDN reactivity decreases not so sharply when V$_2$O$_5$ content increases. These phenomena are related to the acidity of carrier, the capability of providing hydrogenation active site, and the change of catalyst surface area. The results indicated, as a carrier of CoMo catalyst, the appropriate mole ratio of V$_2$O$_5$ in Ti—Zr—V is between 1/1/0.02-1/1/0.10.

TABLE 3

| The effect of V$_2$O$_5$ content in Ti-Zr-V carrier on the reactivities of HDS and HDN; MoO$_3$, 4%; CoO 2%; reaction temperature, 350° C.; WHSV = 2.0 h$^{-1}$ | | | | | | | |
|---|---|---|---|---|---|---|---|
| V$_2$O$_5$ content, mole ratio in TiO$_2$-ZrO$_2$-V$_2$O$_5$ | 0 | 0.025 | 0.05 | 0.075 | 0.10 | 0.125 0.15 | 0.20 |

TABLE 3-continued

The effect of $V_2O_5$ content in Ti-Zr-V carrier on the reactivities of HDS and HDN; $MoO_3$, 4%; CoO 2%; reaction temperature, 350° C.; WHSV = 2.0 h$^{-1}$

| HDS rate constant, k, hr$^{-1}$ | 4.28 | 8.21 | 11.42 | 10.53 | 6.96 | 5.53 | 5.00 | 5.00 |
|---|---|---|---|---|---|---|---|---|
| HDN rate constant k, hr$^{-1}$ | 5.54 | 8.93 | 12.68 | 11.42 | 10.53 | 10.00 | 9.46 | 8.57 |

EXAMPLE 2

The effect of molybdenum content in catalysts with different types of carrier on the reactivities of HDS and HDN.

The content of molybdenum, one of the active components in catalysts, has an optimum when concerning the catalytic activity. Too high a molybdenum content in catalysts will reduce the activity of catalysts. The optimal value varies for different types of carrier. For instance, the optimal $MoO_3$ content for a γ-alumina carrier is ranged from 8 to 15%, for the $TiO_2$ carrier, the optimal content is between 6 and 9%. However, the proper $MoO_3$ content in the Ti—Zr—V carrier prepared by this invention is ranged from 2.0 to 10.0%, preferably 3.0–6.0% as indicated in Table 4, wherein the composition of the carrier is $TiO_2/ZrO_2/V_2O_5=1/1/0.05$ calcined at 550° C., the feed is synthetic A feed, and the reaction is carried out at 350° C. and 500 psig. The results of using γ-alumina as the carrier are listed in Table 5. The data in Table 5 show that the catalysts with low $MoO_3$ gave low activities. This is possibly due to the difficulty of $MoO_3$ reduction. The highest activity can be observed when $MoO_3$ content is between 14 to 16%. Gulari and co-worker also verified that with 7.5% $MoO_3$ content the $CoMo/TiO_2$ catalyst showed the maximum activity, which might be explained by that the reduction of the surface molybdate is easier at 7.5% $MoO_3$ content. The catalyst supported by Ti—Zr—V carrier has maximum HDS and HDN reactivities when the $MoO_3$ loading is 4.0%, and the maximum reactivities are greater than those of using γ-alumina as the carrier. With this result, the conclusion can be made that in a Ti—Zr—V supported system, a less amount of $MoO_3$ is required to obtain a higher activity than that of a $MoO_3/\gamma-Al_2O_3$ system.

TABLE 4

The effect of $MoO_3$ contents in a Ti-Zr-V supported catalyst on reactivities of HDS and HDN; $TiO_2/ZrO_2/V_2O_5 = 1/1/0.05$.

| $MoO_3$ content, wt % | 1.5 | 3.0 | 4.0 | 6.0 | 8.0 | 10.0 | 13.0 | 15.0 |
|---|---|---|---|---|---|---|---|---|
| HDS rate constant, k, hr$^{-1}$ | 1.36 | 3.04 | 5.80 | 4.08 | 3.52 | 2.72 | 1.76 | 0.96 |
| HDN reaction rate constant, k, hr$^{-1}$ | 1.92 | 3.20 | 4.32 | 4.00 | 3.68 | 3.36 | 3.20 | 2.76 |

TABLE 5

The effect of $MoO_3$ contents in a $\lambda-Al_2O_3$ supported catalyst on reactivities of HDS and HDN

| $MoO_3$ content, wt % | 2.0 | 4.0 | 6.0 | 8.0 | 10.0 | 12.0 | 14.0 | 16.0 | 20.0 |
|---|---|---|---|---|---|---|---|---|---|
| HDS rate constant, k, hr$^{-1}$ | 1.40 | 1.78 | 2.58 | 3.67 | 4.84 | 5.30 | 5.40 | 5.36 | 3.69 |
| HDN rate constant, k, hr$^{-1}$ | 1.09 | 1.29 | 1.78 | 2.58 | 3.27 | 3.67 | 3.72 | 3.70 | 2.07 |

EXAMPLE 3

The effect of $CoO/MoO_3$ ratio in a CoMo/Ti—Zr—V catalyst on reactivities of HDS and HDN For the purpose of studying the effect of CoO promoter in Ti—Zr—V system, TZV-4A, TZV-4B, TZV-4C, TZV-4D and TZV-4E are prepared, and their physical properties are shown in Table 6.

TABLE 6

Physical Properties of CoMo/Ti-Zr-V Catalysts

| Catalyst | $MoO_3$ wt % | CoO wt % | S.A. m$^2$/g | pore vol. c.c./g | mean pore dia. Å |
|---|---|---|---|---|---|
| TZV-4A | 4.0 | 0.5 | 130 | 0.30 | 88 |
| TZV-4B | 4.0 | 1.5 | 125 | 0.30 | 90 |
| TZV-4C | 4.0 | 2.0 | 118 | 0.31 | 92 |
| TZV-4D | 4.0 | 3.0 | 114 | 0.32 | 99 |
| TZV-4E | 4.0 | 4.0 | 112 | 0.32 | 104 |
| Commercial catalyst HR | 8.0 | 3.5 | 188 | 0.47 | 100 |

Generally speaking, the addition of CoO to Mo catalysts will dramatically enhance the reactivity of HDS and HDN. Table 7 indicates that the effect of $CoO/MoO_3$ ratio in a CoMo/Ti—Zr—V catalyst on the reactivity of HDS and HDN. At $CoO/MoO_3=0.5$, the highest reactivity of HDS and HDN is observed. For the case of synthetic feed A, the reactivities are enhanced twofold for HDS and threefold for HDN with different types of carrier will result in different increasing ratios. For example: the effect is insignificant when alumina is used as the carrier; however, the reactivity increases 75% when titanium oxide is used as the carrier. Because the cobalt has high activity for hydrogenation and the aniline has to be hydrogenated before it can undergo C—N bond cleavage, the promoted effect of aniline HDN due to cobalt addition is more significant than HDS of dibenzothiophene. In a CoMo/Ti- —Zr—V catalyst for HDS and HDN, the preferred CoO/MoO$_3$ ratio is between 0.27 and 0.75.

TABLE 7

The effect of CoO/MoO$_3$ ratio in a CoMo/Ti-Zr-V catalyst on the reactivities of HDS and HDN

| CoO/MoO$_3$ ratio | 0 | 0.125 | 0.25 | 0.375 | 0.50 | 0.75 | 1.0 |
|---|---|---|---|---|---|---|---|
| HDS relative reactivity (Promoted/Unpromoted) | 1 | 1.19 | 1.33 | 1.47 | 2.12 | 1.67 | 1.55 |
| HDN relative reactivity (Promoted/Unpromoted) | 1 | 1.67 | 1.89 | 2.11 | 3.10 | 2.30 | 2.03 |

EXAMPLE 4

The comparison of HDS of dibenzothiophene and HDN of aniline over TZV-4C and commercial HR catalyst To compare the activity of catalyst prepared by method of this invention with commercial catalyst on HDS and HDN, TZV-4C and commercial HR catalyst (with γ-Al$_2$O$_3$ carrier and compositions listed in Table 3 ) was tested to examine the HDS of dibenzothiophene and HDN of aniline under the reaction conditions of 500 psig, 240°–350° C. and WHSV=2.0. Using the synthetic feed A as the feeding reactant, the results are listed in Table 8 and Table 9. From Table 8, both catalysts shows similar reactivities of HDS at low reaction temperature (260° C.). The Ti—Zr—V supported catalyst has higher hydrogenated products (biphenyl). At 300° C. reaction temperature, the Ti—Zr—V supported catalyst shows higher activity than γ-Al$_2$O$_3$ supported catalyst, and the hydrogenated product also increases (this means biphenyl product decreases). The commercial HR catalyst can not provide effective hydrogenation active site, so that the increase of hydrogenated product is limited. As shown in Table 8, the Ti—Zr—V carrier has the capability of catalyzing hydrogenation; therefore, the reactivity of HDN is twice as high as of the γ-alumina system. At low reaction temperature, the hydrogenolysis of C—N bond is slow which results in the poison of HDS active sites. This explains the low reactivity of HDS. At high reaction temperature, the rate of C—N hydrogenolysis over Ti—Zr—V system is far quicker than that over a γ-Al$_2$O$_3$ system which results in the higher HDS activity. In the mean time, TZV-4C also produces higher hydrogenated product, i.e. cyclohexane, as shown in Table 9.

TABLE 8

The comparison of HDS reactivity of dibenzothiophene and product distribution over TZV-4C and commercial HR catalyst

| Reaction temp. °C. | 240 | 260 | 280 | 300 | 325 | 350 |
|---|---|---|---|---|---|---|
| Conversion of dibenzothiophene, % | | | | | | |
| TZV-4C | 14 | 26 | 56 | 85 | 94 | 99 |
| HR | 16 | 27 | 48 | 71 | 87 | 95 |
| Biphenyl selectivity, % | | | | | | |
| TZV-4C | 64 | 56 | 41 | 30 | 22 | 18 |
| HR | 90 | 85 | 80 | 75 | 72 | 70 |

TABLE 9

The comparison of HDN reactivity of aniline and product distribution over TZV-4C and commercial HR catalyst

| Reaction temp., °C. | 240 | 260 | 280 | 300 | 325 | 350 |
|---|---|---|---|---|---|---|
| Conversion of aniline, % | | | | | | |
| TZV-4C | 17 | 29 | 60 | 85 | 92 | 98 |
| HR | 10 | 15 | 25 | 38 | 57 | 78 |
| Cyclohexane selectivity, % | | | | | | |
| TZV-4C | 55 | 57 | 73 | 82 | 85 | 86 |
| HR | 52 | 53 | 54 | 60 | 68 | 75 |

EXAMPLE 5

The comparison of simultaneous HDS and HDN over various carriers

The literature indicates that the nitrogen compound (such as aniline) will inhibit the HDS of dibenzothiophene, when the feed contains both sulfur and nitrogen compounds. The extent of the inhibition is different for different types of catalyst and carrier. To understand the difference between Ti—Zr—V carrier from this invention and conventional alumina carrier, TZV-4C and A-2 catalysts are chosen to test the reactivity of HDS by feeding both synthetic feed A and synthetic feed B to reactor. Table 10 lists results.

TABLE 10

The effects of nitrogen compound in the feed stream on the HDS reactivity

| Catalyst | TZV-4C | | A-2 | |
|---|---|---|---|---|
| Synthetic feed | A | B | A | B |
| HDS rate constant of Dibenzothiophene, k, hr$^{-1}$ | | | | |
| 240° C. | 0.32 | 0.40 | 0.34 | 0.39 |
| 260° C. | 0.59 | 0.74 | 0.58 | 0.79 |
| 280° C. | 1.62 | 1.94 | 1.30 | 2.25 |
| 300° C. | 3.07 | 3.60 | 1.87 | 3.17 |
| 325° C. | 4.94 | 6.54 | 2.85 | 5.18 |
| 350° C. | 11.82 | 12.80 | 4.20 | 9.68 |

Note:
1. A-2 is CoMo/Y-Alumina catalyst, wherein the MoO$_3$ is 4% and CoO is 2%.
2. The compositions of synthetic feed A and B are listed in Table 1.

Table 10 discloses that HDS reactivity of feed B is slightly higher than feed A, which indicates the nitrogen compound has insignificant poison effect on a Ti—Zr—V carrier. Especially at 350° C. reaction temperature, the reactivities of both feeds are close. However, in the A-2 catalyst case (using alumina as carrier), it shows a significant difference for feed A and B. At the reaction temperature higher than 280° C., the difference between feed A and B is by one fold. The results indicate that the nitrogen compound has significant effect on alumina carrier. Normally, oil such as heavy diesel and vacuum gas oil always contain nitrogen compounds, so that using the Ti—Zr—V carrier of present invention certainly will have greater HDS activity.

EXAMPLE 6

The comparison of HDS reactivity over TZV-4C and commercial HR catalyst

To examine CoMo/Ti—Zr—V in actual practice, a heavy diesel and a vacuum gas oil were chosen as feedstocks to test the HDS reactivities over TZV-4C catalyst and commercial HR catalyst. Results are given in FIGS. 1 and 2, where the $x_s/1-x_s$ ratio indicates the reactivity of HDS. In heavy diesel feedstock runs, the TZV-4C and the commercial HR catalyst had similar reactivities at the reaction temperature of 280° C. However, at the operating temperature higher than 280° C., the TZV-4C is more active. The reactivity difference between both catalysts increases as temperature increases. FIG. 2 also shows the same trend for the runs of using vacuum gas oil as feedstock.

From the abovementioned examples, it is shown that the CoMo catalyst supported by the Ti—Zr—V mixed is more active than conventional CoMo/$\gamma$-Al$_2$O$_3$ catalysts in the application of HDS and HDN. The optimal amount of MoO$_3$ is 4%, which is far less than the 8-15% loading of conventional catalysts. Especially, because the Ti—Zr—V supported catalyst can tolerate the nitrogen compounds, which are always found in the petroleum fraction, it enhances the efficacy of using the catalyst system of the invention.

We claim:

1. A process for hydrodesulfurization and hydrodenitrogenation of a petroleum fraction which comprises,
    providing a catalyst composition consisting essentially of a carrier of co-precipitated titanium, zirconium and vanadium prepared from a TiO$_2$/ZrO$_2$/V$_2$O$_5$ mixture in mole ratio between 1/1/0.02 and 1/1/0.1, and MoO$_3$ and CoO as active ingredients, the MoO$_3$ being present by about 2 to about 10% by weight, a ratio of CoO/MoO$_3$ being in a range of about 0.27 to about 0.75, and,
    subjecting the petroleum fraction in the presence of the catalyst composition to reaction conditions of
    a temperature between about 280 degrees and about 400 degrees C.,
    a hydrogen pressure between about 500 and about 1200 psig,
    a hydrogen to petroleum ratio of about 1000 to about 4000 SCF per barrel of fraction, and
    a space velocity of between about 0.5 and about 2.0.

2. A process for hydrodesulfurization and hydrodenitrogenation of a petroleum fraction as set forth in claim 1 in which the catalyst composition is one which has been pre-sulfided with a 6% CS$_2$ toluene solution and under conditions of LHSV of 1.25,
    hydrogen/toluene mole ratio of about 6.0,
    pressure of about 430 psig,
    a temperature initiated at about 50 degrees C., and raised to about 250 degrees C., at the rate of about 50 degrees C./hr whereat it is maintained for about 16 hours, and
    the temperature thereafter being raised to about 350 degrees C. at a rate of 50 degrees C./hr where it is maintained for about 24 hours.

* * * * *